3,055,854
EPOXIDE/POLYACROLEIN REACTION PRODUCTS, THEIR PREPARATION AND THEIR USE

Henry Piotrowski, Akron, and Gerard E. Van Gils, Cuyahoga Falls, Ohio, assignors to The General Tire & Rubber Company, Akron, Ohio, a corporation of Ohio
No Drawing. Filed May 15, 1959, Ser. No. 813,355
19 Claims. (Cl. 260—29.6)

This invention relates to modification of alpha alkyl substituted acrolein polymers such as polymethacrolein to obtain reaction products which are insoluble in weak alkali solution and to the use of same as textile finish to impart wash and wear properties thereto.

In the past modified polyacrolein products have been prepared by a process in which a latex or dispersion of a methacrolein polymer or copolymer is subjected to a base having a disassociation constant higher than that of ammonium hydroxide at a slightly elevated temperature, such as a temperature of around 90° C. The resultant modified polymer product is characterized by many hydroxyl and carboxyl groups which are apparently spaced along the macromolecule in accordance with the aldehyde groups of the original methacrolein polymer or copolymer. Most of the aldehyde groups are alternately converted to methylol and carboxyl groups to form a Cannizzaro-like reaction product. Depending upon the salt thus formed, the modified polymer product readily dissolves and disassociates in water to serve as a polyelectrolyte.

An ammonium salt of the Cannizzaro-like polymethacrolein reaction product can be formed having recurring units of the following formula:

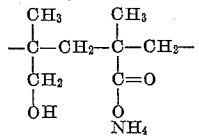

While the ammonium salt cannot be formed by reacting polymethacrolein with NH$_4$OH, the ammonium salt can be prepared indirectly by reacting the polymethacrolein with a strong base such as NaOH to obtain the Cannizzaro-like reaction product having preferably 75–90% of its aldehyde groups alternately reduced and oxidized and thereafter acidifying an aqueous solution of the sodium salt i.e. (or the polymethyl propenol-sodium methacrylate) to precipitate the same. In order to obtain the ammonium salt, the precipitate is washed to remove the sodium and dissolved in NH$_4$OH to form the ammonium salt.

The free acid or ammonium salt is readily converted into a lactone on heating and drying. The lactone, while insoluble in water, is soluble in hot dilute alkaline solutions such as used in laundering operations. Thus the above reaction products cannot be used successfully as a finish for wash and wear fabrics which would be subjected to a detergent warm and even hot.

It is an object of the present invention to provide a modified Cannizzaro-like reaction product of an alkyl-alpha substituted polymer which is insoluble in warm dilute alkaline solutions.

It is an object to provide a method of coating textile fabrics to impart wash and wear properties and thereto by dipping a fabric in a coating bath containing a modified Cannizzaro-like reaction product of an alkyl-alpha substituted polymer which is insoluble in warm dilute alkaline solutions indirectly by reacting the polymethacrolein with a strong base such as NaOH to obtain the Cannizzaro-like reaction product having preferably 75–90% of its aldehyde groups alternately reduced and oxidized and thereafter acidifying an aqueous solution of the sodium salt (i.e. or the polymethyl propenol-sodium methacrylate) to precipitate the same.

In order to obtain the ammonium salt, the precipitate is washed to remove the sodium and dissolved in NH$_4$OH to form the ammonium salt.

The free acid or ammonium salt is readily converted into a lactone on heating and drying. The lactone, while insoluble in water, is soluble in hot dilute alkaline solutions such as used in laundering operations.

It has been found that modified polyacrolein products can be made which are insoluble in warm and even hot dilute alkali by mixing and reacting an acrolein polymer reaction product of an alpha alkyl substituted acrolein polymer and a base having a disassociation constant greater than that of ammonium hydroxide, said acrolein polymer reaction product containing recurring units of the formula:

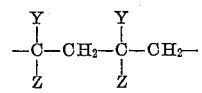

where Y is an alkyl group of 1 to 12 carbon atoms and Z is selected from a member of the group consisting of (A) —CH$_2$OH, (B) —CHO and (C) 

where X is a cation having the formula

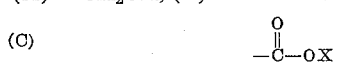

in which R$_1$, R$_2$ and R$_3$ are selected from a member of the group consisting of hydrogen, alkyl and alkyl aryl in which the alkyl radical has less than 6 carbon atoms, where 20 to 45% by weight of said Z groups are —CH$_2$OH groups, 20 to 45% by weight of said Z groups are

groups and the balance of said Z groups are —CHO groups.

Any organic diepoxide may be used to insolubilize in water the ammonium Cannizzaro polymethacrolein (or polymethyl propenol-ammonium methacrylate) but we have only found two commercially obtainable types of diepoxides which render the material insoluble in hot alkali solutions. These exceptional diepoxide types are illustrated by the epoxy alkyl substituted epoxy allicyclic compounds such as 1 epoxy ethyl-3,4 epoxy cyclohexane, otherwise known as vinyl cyclohexane dioxide

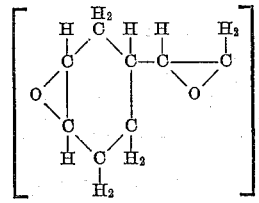

and the diglycidyl ethers of the general formula:

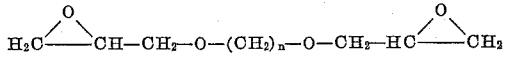

where n is an integer from 1 to 10 and preferably 4 or 5.

Of the above named diepoxide compounds found suitable for insolubilizing the polymethyl propenol-ammonium methacrylate reaction products, 1-epoxy ethyl-3,4-epoxy cyclohexane and the diglycidyl ether of pentant diol 1,5 provide the best insolubilization action. The above two diepoxides render films deposited from the reaction products subsequently from the diepoxides and the ammonium salt of the Cannizzaro-like polymethacrolein reaction product almost completely insoluble in hot diluted alkalis such as those used in laundering practice. The insolubilization or decrease in swellability of course depends in some measure on the amounts of epoxide present even small amounts such as 10% or so of the diepoxide are quite effective. However, it is generally preferred to use about 15 to 40 parts of the diepoxide for 60 to 85 parts by weight of the polymethacrolein derivative.

Many diepoxides were reacted with polymethylpropenol-ammonium methacrylate (hereinafter sometimes designated as $NH_4CPMA$) but only the 3 above named diepoxides were found effective insolubilizing agents for hot alkali. While the diepoxide formed from the reaction of epichlorohydrin and bisphenol A, epichlorohydrin dichloroepoxybutane, butadiene epoxide and others may insolubilize the $NH_4CPMA$ product to a slight extent, the 3 named diepoxides (i.e. 1-epoxy ethyl-3,4-epoxy cyclohexane and the diglycidyl ethers of butane diol and pentane diol) render films from 75 to 97% or more insoluble in dilute warm alkaline solutions while the unmodified NaCPMA (sodium Cannizzaro polymethacrolein) product alone is less than 10% insoluble.

According to the present invention, fabrics are coated with a wash and wear film by dipping a fabric in a coating both having (1) about 5 to 25 percent total solids content of $NH_4CPMA$ (or other ammonum and amine derivatives of the Cannizzaro polyacrolein reaction products) and (2) about 1 to 35 parts by weight per 100 parts of $NH_4CPMA$ of preferably the diglycidyl ether of pentane diol (or other previously named diepoxide) and then drying the fabric and film deposited thereon. The fabric and film is cured for preferably about 15 to 45 minutes at preferably 115° C. to 140° C. When the coated fabric is washed in a household washing machine containing a detergent, a fabric film that is over 90% permanently insolubilized even after many repeated washing cycles is obtained.

The above wash and wear films can be applied to cotton, nylon, rayon, wool and other textile fabrics or textiles made from a mixture of the above textile fibers in any suitable manner such as spraying aqueous solution, although dipping is the preferred method of application. In any event, a total solids content of $NH_4CPMA$ (ammonium Cannizzaro polymethacrolein) is about 2 to 10 parts by weight.

The preferred drying or curing conditions are about 115 to 135° C. for most commercial operations although the reaction will take place at room temperature with a reaction time of several days. The reaction proceeds much more rapidly at 100° C. and 115° C.–120° C. is even faster and generally more economical and generally require curing time of 20 to 40 minutes. A high reaction temperature, such as 140° to 150° F. or even more can be used to speed up the reaction time to 10 minutes or less.

Using the above outlined preferred conditions, coated fabrics were tested for loss in weight after many cycles in a washing machine using common detergents and using diluted alkaline solution such as a 1% by weight sodium carbonate solution. As low as 2 to 3 percent by weight loss was observed, and even this relatively low loss may have been due to abrasion or friction.

The methacrolein polymers and copolymers, which are to be reacted with primary amines according to the present invention, can be formed by any recognized polymerization system such as mass polymerization systems, pearl or suspension polymerization systems and emulsion polymerization systems. The suspension and emulsion polymerization systems are peferred because they are easier to work with and, in addition, the emulsion system can lead to polymers with higher molecular weight than those formed by the mass or suspension systems.

Substantial benefits are obtained in accordance with the present invention when the molecular weight of the polymethacrolein starting material is as low as 500 but for most purposes it is desirable that the average molecular weight be around 1000 up to 5000 or more.

The following example illustrates a suitable preparation of a polymethacrolein polymer:

EXAMPLE 1

The following ingredients were placed in a closed vessel and subjected to intermittent agitation:

| | Parts |
|---|---|
| Water | 300 |
| Methacrolein | 100 |
| Persulfate initiator | .3 |
| Dupanol C emulsifier | 4.0 |

The pH of the recipe was adjusted to approximately 3.5 with acetic acid and the temperature was kept at approximately 50° C. At the end of 12 hours, the reaction proceeded to approximately 95 percent completion and a polymethacrolein latex was formed having about 25 percent solids. The yield was about 95 parts of polymethacrolein.

The persulfate initiator is added to speed up the reaction. Other initiators, such as hydrogen peroxide and benzoyl peroxide, capable of oxidizing or providing free radicals are also satisfactory. Air alone will initiate the reaction but it gives a very slow reaction in comparison to reactions employing conventional initiators.

In order to prepare the polymethacrolein reaction product for subsequent reaction with a primary amine, an aqueous dispersion (including suspensions and emulsions) of polymethacrolein, for example, such as that prepared in Example 1 above, is subjected to a base having a disassociation constant greater than $1.8 \times 10^{-5}$, or a base having a disassociation constant greater than that of ammonium hydroxide at 25° C. Preferable bases are hydroxides and basic salts of the substantially water soluble alkali metals, sodium, potassium and lithium. However, any other basic substance having a disassociation constant greater than ammonium hydroxide may be used. Strong organic bases such as di-isobutyl amine, di-isopropyl amine and other secondary or tertiary alkyl amines, preferably having less than six aliphatic carbon atoms, and certain of the amines, such as piperidine, also bring about the desired reaction. The pH of the reaction mixture (base plus polymethacrolein polymer) should be above 8 and preferably around 11 or above.

The reaction apparently reduces part (usually 20 to 45 or even almost up to 50%) of the aldehyde groups of the methacrolein polymer or copolymer to hydroxyl to form an alcohol and oxidizes another equivalent part to carboxyl groups, which in turn react with the base to form the corresponding salt. The reaction is similar to the so-called Cannizzaro reaction. One mole of base is theoretically added for each two moles of methacrolein in the polymer. From 35 to 40 percent up to 50 to 60 percent of the theoretical amount of base is preferably added to the methacrolein polymer to convert about 81-88 percent of the aldehyde groups and when 100 percent of the theoretical amount of base is added the actual conversion is found to be around 90 percent of theoretical aldehyde groups present. Generally, as low as .3 mole of base and as high as 1.5 moles can be used per mole of aldehyde. The present conversion depends upon the amount of base employed. For reaction with primary amines according to the present invention, a polymethacrolein polymer is employed in which preferably 83-87% of the aldehyde groups have been converted to hydroxyl and carboxyl groups.

The term "methacrolein polymer" is here used generically to include copolymers having substantial methacrolein residues present. Copolymers of methacrolein with one or more diolefinic compounds of less than 8 carbon atoms, including the conjugated diolefines, butadiene, isoprene, chloroprene, cyanoprene, dimethyl butadiene, and/or with a copolymerizable mono-olefinic compound such as styrene, acrylonitrile, methyl isopropenyl ketone and other available, olefinically-unsaturated, polymerizable organic compounds can also be used and subjected to the process described above to form compounds with similar unusual properties. As the amount of methacrolein in the copolymer is reduced, however, the number of aldehyde groups in the copolymer is reduced and the unusual effects obtained by the reaction become less apparent and less effective. Copolymers and copolymer mixtures can also be used to vary the effect of the methacrolein and obtain the desired degree of disassociation and hydrophilicity.

A methacrolein polymer may also be used herein which is formed by grating methacrolein to copolymers of a conjugated diolefin having less than 8 carbon atoms such as butadiene and a copolymerizable monovinyl monomer such as styrene, acrylonitrile, methyl isopropenyl ketone or other copolymerizable mono-olefinic compound as listed above. An example of a suitable methacrolein polymer formed as described is a butadiene-methacrolein copolymer having methacrolein grafted thereto and converted to a water soluble polymer by means of Cannizzaro-like reaction in which the grafted polymer is refluxed with sodium hydroxide.

The structure of essential portions of the reaction product (to be subsequently reacted with primary amines) consists essentially of recurring units of the formula:

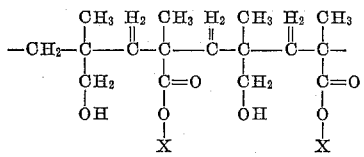

in which X is a cation and preferably an alkali or alkali earth such as Na, K, Li or Ca although X can be also

$R_2$ and $R_3$ are selected from the group consisting of H, alkyl, and aryl-alkyl radicals having less than 6 aliphatic carbon atoms. The reaction product is sometimes hereinafter referred to as a polymethylpropenol-methacrylate salt or a polymethylpropenol-methacrylate. Examples of reaction products contemplated by this reaction are polymethylpropenol-sodium methacrylate, polymethylpropenol-potassium methacrylate, polymethyl-propenol-ammonium methacrylate, polymethylpropenol-ethyl phenyl ammonium methacrylate, polymethylpropenol-dimethyl ammonium methacrylate, polymethyl-propenol-trimethyl ammonium methacrylate and the like. Of these, the sodium, lithium and calcium salts are highly preferred for reaction with primary amines.

The following example illustrates the reaction of a strong base and a polymer of methacrolein.

EXAMPLE 2

The latex of Example 1 was diluted with distilled water to form a latex having approximately 10 percent solids. 500 grams of this latex representing about 50 grams dry weight polymethacrolein were added to an autoclave together with 15 grams of sodium hydroxide in solution. The pH of the resultant mixture was around 12 and the mixture was thoroughly stirred up. After the temperature had been raised to around 90° C., an exothermic reaction commenced and the latex gradually changed to a milky paste and became more viscous. As the reaction was completed, the mixture formed a very light yellow solution. The major portion of this reaction was completed in approximately 2 hours and at the end of 3 hours the solution was placed in a vacuum pan and dried. The product yield was 46.3 grams of polymethylpropenol-sodium methacrylate.

The acid number of free acid of the product was 230 and the product consisted essentially of recurring units of the following structure:

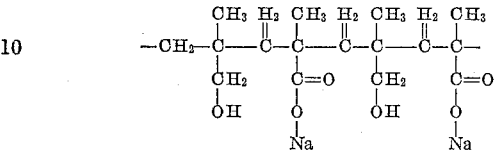

In the above example, the latex was diluted to around 10 percent solids to reduce the thickness and viscosity of the resultant product and to facilitate the temperature control. The temperature should be above 80° C. and preferably around 90° C. Since the reaction is exothermic, the reacting mass should preferably be cooled after the reaction has commenced.

Copolymers of methacrolein with other monomers are subject to the same reaction and can be employed to form similar compounds. In order to obtain water soluble products, however, the methacrolein monomer should preferably form from 70 to 75 or more percent by weight of the copolymer. Monomers forming copolymers with methacrolein are aryl-vinyl compounds such as styrene, alpha methyl styrene, and vinyl toluene, conjugated diolefinic compounds having less than eight aliphatic carbon atoms such as butadiene, chloroprene, isoprene, unsaturated aliphatic nitriles such as acrylonitrile and methacrylonitrile, and unsaturated aliphatic ketones such as methyl isopropenyl ketone and methyl vinyl ketone.

We can also obtain water soluble products by using mixtures of the methacrolein homopolymer and/or one or more methacrolein copolymers in which mixtures, the methacrolein (residue from polymerization of methacrolein) comprises from 70 to 75 percent or more of the total weight of the mixture.

In accordance with our invention, copolymers and copolymer mixtures containing methacrolein may be compounded and subjected to the Cannizzaro type reaction to produce copolymers as desired for specific purposes. For instance, if a copolymer with some rubbery characteristics is desired, butadiene is employed in the copolymer. In certain cases where the copolymerization of methacrolein with another monomer does not lead to an alternating or random type polymerization, it is possible to obtain copolymers which will undergo the Cannizzaro type reaction; but, instead of yielding water soluble products, yield products which are swollen by water. It is also possible to obtain such products by conditioning the reaction on copolymers containing less than 70 percent methacrolein.

The following example illustrates the preparation of an ammonium salt from polymethyl propenyl-sodium methacrylate:

EXAMPLE 3

To an aqueous solution of polymethylpropenyl-sodium methacrylate around 1 percent of a dilute acid is slowly added. At a pH of around 4.8, the acid reaction product of polymethyl propenol-sodium-methacrylate precipitates out of solution. The precipitate is washed several times with water to eliminate the sodium and finally it is dissolved in ammonium hydroxide. This forms the ammonium salt or polymethylpropenol-ammonium methacrylate which readily goes into solution. The solution is carefully dried and the ammonium salt remains.

The following properties were observed for the polymethyl-propenol-ammonium methacrylate deposited from aqueous solution:

| | |
|---|---|
| NaOH acid No. | °C__ 77.7 |
| Initial softening temperature | °C__ 115 |
| Initial dehydration temperature | °C__ 125 |
| Dehydration complete | °C__ 150 |
| Initial softening temperature of lactone | °C__ 230 |
| Discoloration begins | °C__ 250 |
| Free flow temperature | °C__ 290–300 |

The free acid or ammonium salt is readily converted into a lactone on heating and drying. In fact, care must be exercised in drying these products because as the drying temperature is increased from 30° C., the amount of lactone formed is increased. The lactone is insoluble in water. When the drying temperature is 150° C., the product is essentially a lactone. At intermediate temperatures, various degrees of swelling, solubility, and gel formation are encountered indicating the amount of lactone formed.

The formation of a lactone is illustrated below, again referring to recuring units of polymethylpropenol-ammonium methacrylate.

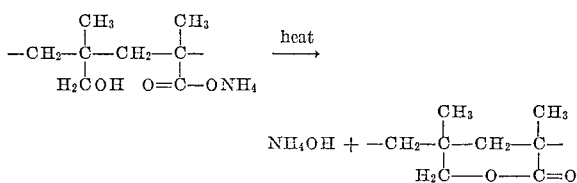

Ammonium hydroxide or ammonia and water are liberated in formation of the above lactone. Similar lactones can be formed from amine salts, preferably when the amine radical has less than four carbon atoms.

EXAMPLE 4

A series of cotton cloth samples about 5 yards in length were treated in various coating baths. The coated samples were dried, cured at 110° C. for 30, 60 and 90 minutes and thereafter checked for loss of coating after washing three cycles in a household washing machine using a 1% aqueous solution of sodium carbonate having a pH of 11 and a temperature of 70° C. Each of the coating baths contained 15% by weight of NH₄CPMA and 5% by weight of the NH₄CPMA of various epoxies as shown in Table III. The various epoxies and the percent insolubilization exhibited by each epoxide/NH₄CPMA coating are listed in Table III which follows:

*Table III*

| Coated Sample | | Percent Insolubilization after heating at 110° F. | | |
|---|---|---|---|---|
| | | 30 min. | 60 min. | 90 min. |
| A | Vinyl cyclohexane dioxide | 78 | 85 | 90 |
| B | Diglycidyl ether or pentanediol | 70 | 87 | 95 |
| C | Diglycidyl ether of butanediol | 50 | 82 | 92 |
| D | EP-201 | 25 | 40 | 65 |
| E | Epichlorohydrin | 30 | 50 | 68 |
| F | Ethylene diamine | 20 | 50 | 69 |
| G | ERL-2774 | 27 | 28 | 29 |
| H | Dichloro epoxy butane | 17 | 18 | 19 |
| I | Allyl epoxy stearate | 21 | 26 | 29 |
| J | Butadiene diepoxide | 18 | 16 | 10 |
| K | Control (NH₄CPMA alone) | 5 | 6 | 7 |

In the above table, ERL-2774 is a monomeric diglycidyl ether of bisphenol A, at least 80% is monomeric and not polymeric in form also in Table III, EP-201 is a cyclohexane diepoxide material having the formula:

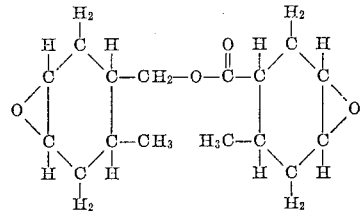

It can be seen in Table III that the resistance of coated samples A, B and C to loss due to solubility in hot dilute alkali is outstanding.

EXAMPLE 5

A series of coated samples were prepared as described in Example 4 except the cloth samples were heated at 110° C. for only 30 minutes instead of 30, 60 and 90 minutes as in Example 4. The results of their insolubility in cold water and in a 1% Na₂CO₃ solution at 80° C. are shown in Table IV.

*Table IV*

| 5% Epoxide, 30′ at 110° C. | Cold Water | Hot Alkalis |
|---|---|---|
| Vinyl cyclohexane dioxide | 100 | 77 |
| Diglycidyl-pentane | 100 | |
| Diglycidyl-butane | 100 | 50 |
| EP-201 [1] | 100 | 25 |
| ERL-2774 [2] | 100 | 27 |
| Dichloro epoxy butane | 100 | 17 |
| Butadiene epoxide | 100 | 17 |
| Epichlorohydrin | 96 | 20 |
| Allyl epoxy stearate | 96 | 21 |
| Dichloro isopropanol | 95 | 10 |
| Ammonium CPMA without epoxide | 45 | 7 |

[1] An epoxy product defined in Example 4.
[2] An epoxy product defined in Example 4.

EXAMPLE 6

Cotton cloths of 5 yards length were treated as described in Example 4 with a coating bath containing 15% by weight of NH₄CPMA and 5% of the NH₄CPMA of one of two diepoxides, namely the diglycidyl ether of pentanediol and the diglycidyl ether of butanediol. The coated samples were cured at 125° C. for 30 minutes and then washed in a household washing machine containing hot water and a detergent so that the solution was alkaline. Even after 3 cycles of washing the cotton cloth showed less than 5 percent weight loss for the coating made with the diglycidyl ether of butane diol and less than 6% for the coating made with the diglycidyl ether of pentanediol.

In the preceding examples the ammonium salt of the polymethacrolein reaction product (polymethyl propenol-ammonium methacrylate) may be substituted in whole or part by ammonium salts of poly-alkylalpha substituted-acrolein reaction products which have the recurring units of the following general formula:

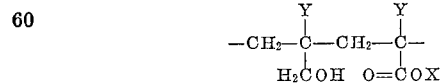

where Y is an alkyl group of 1 to 12 carbon atoms and preferably 1 to 5 carbon atoms for the best binding action, and where X is a cation having the formula

in which $R_1$, $R_2$ and $R_3$ are selected from a member of the group consisting of hydrogen, alkyl and alkyl-aryl radicals having less than 6 aliphatic carbon atoms. Examples of the above described ammonia salts are polymethyl propenol-ammonium methacrylate, polyethyl propenol-ammonium ethacrylate, polymethyl propenol-dimethyl ammonium methacrylate, polymethyl propenol-ethyl phenyl ammonium methacrylate, polyethyl propenol-ethyl phenyl ammonium ethacrylate, polymethyl propenol-dimethyl ammonium methacrylate, polymethyl propenol-propyl dimethyl ammonium methacrylate, polymethyl propenol-phenyl butyl ammonium methacrylate and poly propyl propenol-diamyl ammonium methacrylate. While any of the above salts can be used, the best results are obtained when X is —NH$_4$. Similarly, the preferred binding salts are those in which R$_1$, R$_2$ and R$_3$ are hydrogen and alkyl groups of 1 to 3 carbon atoms. These ammonium and amine salts of polyalkyl substituted acrolein reaction products may be prepared in the same manner as illustrated for polymethylpropenol-ammonium methacrylate except that alkyl alpha substituted-acrolein polymers such as a polyethacrolein and polypropyl acrolein and other alkyl substituted polymers having the monomer formula

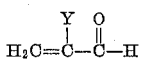

(where Y is an alkyl radical of 1 to 12 carbon atoms) may be substituted for all or part of the polymethacrolein starting material.

It is to be understood that in accordance with the provisions of the patent statutes variations and modifications of the specific invention herein described may be made without departing from the spirit of the invention.

What we claim is:

1. The method which comprises mixing at at least room temperature (1) from about 10 to 40 parts by weight of an organic diepoxide and (2) from 90 to 60 parts by weight of an acrolein polymer containing recurring units of the formula:

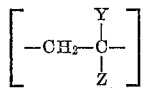

where Y is an alkyl group of from 1 to 12 carbon atoms and Z comprises the groups —CH$_2$OH, —CHO and

where X has the formula

in which R$_1$, R$_2$ and R$_3$ are selected from a member of the group consisting of hydrogen, alkyl, and alkyl aryl radicals where the alkyl portion has less than 6 aliphatic carbon atoms, where from about 20 to 45% by weight of said Z groups are —CH$_2$OH groups, from 20 to 45% by weight of said Z groups are

groups and the balance of said Z groups are —CHO groups, any remaining units in said acrolein polymer being derived from olefinically-unsaturated, polymerizable organic compounds.

2. The method which comprises mixing at at least room temperature (1) from about 15 to 40 parts by weight of an organic diepoxide selected from the group consisting of alkyl substituted alicyclic diepoxides and diglycidyl ethers of the general formula:

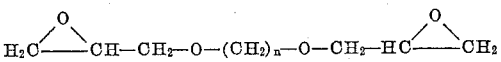

where $n$ is an integer of from 1 to 10, and (2) from about 85 to 60 parts by weight of an acrolein polymer containing, in an amount of at least 70%, recurring units of the formula:

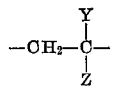

where Y is an alkyl group of from 1 to 12 carbon atoms and Z comprises the groups —CH$_2$OH, —CHO and

where X has the formula

in which R$_1$, R$_2$ and R$_3$ are selected from the group consisting of hydrogen, alkyl, and alkyl aryl radicals in which the alkyl portion has less than 6 aliphatic carbon atoms, where from about 20 to 45% by weight of said Z groups are —CH$_2$OH groups, from 20 to 45% by weight of said Z groups are

groups and the balance of said Z groups are —CHO groups, any remaining units in said acrolein polymer being derived from olefinically-unsaturated, polymerizable organic compounds.

3. The method of claim 2 in which said diepoxide is 1-epoxyethyl-3,4-epoxy cyclohexane.

4. The method of claim 2 in which said diepoxide is

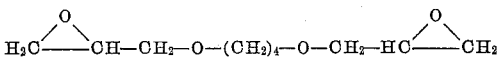

5. The method of claim 2 in which said diexpoxide is

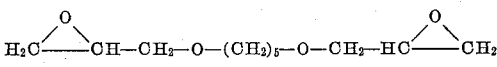

6. The method of claim 2 in which said X is —NH$_4$.

7. A composition comprising the reaction product of (1) from about 10 to 40 parts by weight of an organic diepoxide and (2) from 90 to 60 parts by weight of an acrolein polymer containing recurring units of the formula:

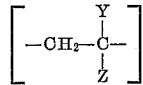

where Y is an alkyl group of from 1 to 12 carbon atoms and Z comprises the groups —CH$_2$OH, —CHO and

where X has the formula

in which R$_1$, R$_2$ and R$_3$ are selected from a member of the group consisting of hydrogen, alkyl and alkyl aryl radicals where the alkyl portion has less than 6 aliphatic carbon atoms, where from about 20 to 45% by weight of said Z groups are —CH$_2$OH groups, from 20 to 45% by weight of said Z groups are

groups and the balance of said Z groups are —CHO groups, any remaining units in said acrolein polymer being derived from olefinically-unsaturated, polymerizable organic compounds.

8. A composition comprising the reaction product of (1) from about 15 to 40 parts by weight of an organic diepoxide selected from the group consisting of alkyl substituted alicyclic diepoxides and diglycidyl ethers of the general formula:

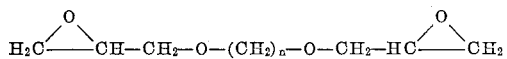

where $n$ is an integer of from 1 to 10 and (2) from 85 to 60 parts by weight of an acrolein polymer containing, in an amount of at least 70%, recurring units of the formula:

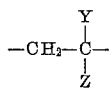

where Y is an alkyl group of from 1 to 12 carbon atoms and Z comprises the groups —CH$_2$OH, —CHO and

where X has the formula

in which R$_1$, R$_2$ and R$_3$ are selected from the group consisting of hydrogen, alkyl, and alkyl aryl radicals in which the alkyl portion has less than 6 aliphatic carbon atoms, where from about 20 to 45% by weight of said Z groups are —CH$_2$OH groups, from 20 to 45% by weight of said Z groups are

groups and the balance of said Z groups are —CHO groups, any remaining units in said acrolein polymer being derived from olefinically-unsaturated, polymerizable organic compounds.

9. A composition of claim 8 in which said diepoxide is 1-epoxyethyl-3,4-epoxy cyclohexane.

10. A composition of claim 8 in which said diepoxide is

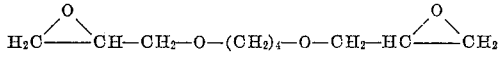

11. A composition of claim 8 in which said diepoxide is

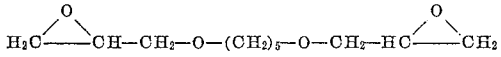

12. A composition of claim 8 in which said X is —NH$_4$.

13. A composition comprising an aqueous dispersion containing from about 5 to 25% by weight of solids, said solids prepared by mixing at at least room temperature (1) from about 10 to 40 parts by weight of an organic diepoxide, and (2) from 90 to 60 parts by weight of an acrolein polymer containing recurring units of the formula

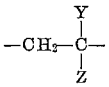

where Y is an alkyl group of from 1 to 12 carbon atoms and Z comprises the groups —CH$_2$OH, —CHO and

where X has the formula

in which R$_1$, R$_2$ and R$_3$ are selected from a member of the group consisting of hydrogen, alkyl, and alkyl aryl radicals in which the alkyl portion has less than 6 aliphatic carbon atoms, where from about 20 to 45% by weight of said Z groups are —CH$_2$OH groups, from 20 to 45% by weight of said Z groups are

groups and the balance of said Z groups are —CHO groups, any remaining units in said acrolein polymer being derived from olefinically-unsaturated, polymerizable organic compounds.

14. A composition comprising an aqueous dispersion containing from about 5 to 25% by weight of solids, said solids prepared by mixing at at least room temperature (1) from about 10 to 40 parts by weight of an organic diepoxide selected from the group consisting of alkyl substituted alicyclic diepoxides and epoxides having the formula

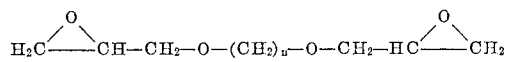

where $n$ is an integer of from 1 to 10, and (2) from 90 to 60 parts by weight of an acrolein polymer containing recurring units of the formula:

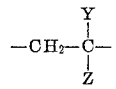

where Y is an alkyl group of from 1 to 12 carbon atoms and Z comprises the groups —CH$_2$OH, —CHO and

where X has the formula

in which R$_1$, R$_2$ and R$_3$ are selected from a member of the group consisting of hydrogen, alkyl, and alkyl aryl radicals in which the alkyl portion has less than 6 aliphatic carbon atoms, where from about 20 to 45% by weight of said Z groups are —CH$_2$OH groups, from 20 to 45% by weight of said Z groups are

groups and the balance of said Z groups are —CHO groups, any remaining units in said acrolein polymer being derived from olefinically-unsaturated, polymerizable organic compounds.

15. The method which comprises treating a textile material composed of organic fibers with an aqueous coating bath comprising from about 5 to 25 percent solids, said solids prepared by mixing at at least room temperature (1) from about 10 to 40 parts by weight of an organic diepoxide and (2) from 90 to 60 parts by weight of an acrolein polymer containing recurring units of the formula:

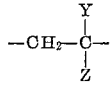

where Y is an alkyl group from 1 to 12 carbon atoms and where Z comprises the groups —CH$_2$OH, —CHO and

where X is a cation having the formula

in which R$_1$, R$_2$ and R$_3$ are selected from a member of the group consisting of hydrogen, alkyl and alkyl aryl radicals in which the alkyl portion has less than 6 aliphatic carbon atoms, where from about 20 to 45% by weight of said Z groups are —CH$_2$OH groups, from 20 to 45% by weight of said Z groups are

groups and the balance of said Z groups are —CHO groups, any remaining units in said acrolein polymer being derived from olefinically-unsaturated, polymerizable organic compounds, to deposit a coating of said solids on the fibers of said textile material and heating said coated fibers of said textile material to cause reaction between said (1) and said (2).

16. The method which comprises treating a textile material composed of organic fibers with an aqueous coating bath comprising from about 5 to 25 percent solids, said solids prepared by mixing at at least room temperature (1) from about 10 to 40 parts by weight of an organic diepoxide selected from the group consisting of alkyl substituted alicyclic diepoxides and epoxides having the formula

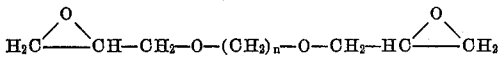

where $n$ is an integer of from 1 to 10, and (2) from 90 to 60 parts by weight of an acrolein polymer containing recurring units of the formula:

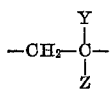

where Y is an alkyl group from 1 to 12 carbon atoms and where Z comprises the groups —CH$_2$OH, —CHO and

where X is a cation having the formula

in which R$_1$, R$_2$ and R$_3$ are selected from a member of the group consisting of hydrogen, alkyl and alkyl aryl radicals in which the alkyl portion has less than 6 aliphatic carbon atoms, where from about 20 to 45% by weight of said Z groups are —CH$_2$OH groups, from 20 to 45% by weight of said Z groups are

groups and the balance of said Z groups are —CHO, any remaining units in said acrolein polymer being derived from olefinically-unsaturated, polymerizable organic compounds, to deposit a coating of said solids on the fibers of said textile material and heating said coated fibers of said textile material to accelerate reaction between said (1) and said (2).

17. The method of claim 16 in which said heating step is conducted at a temperature of from about 100 to 150° C.

18. A textile material composed of organic fibers having a water insoluble coating comprising the reaction product of (1) from about 10 to 40 parts by weight of an organic diepoxide, and (2) from 90 to 60 parts by weight of an acrolein polymer containing recurring units of the formula

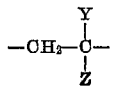

where Y is an alkyl group from 1 to 12 carbon atoms and where Z comprises the groups —CH$_2$OH, —CHO and

where X is a cation having the formula

in which R$_1$, R$_2$ and R$_3$ are selected from a member of the group consisting of hydrogen, alkyl and alkyl aryl radicals in which the alkyl portion has less than 6 aliphatic carbon atoms, where from about 20 to 45% by weight of said Z groups are —CH$_2$OH groups, from 20 to 45% by weight of said Z groups are

groups and the balance of said Z groups are —CHO groups, any remaining units in said acrolein polymer being derived from olefinically-unsaturated, polymerizable organic compounds.

19. A textile material composed of organic fibers having a water insoluble coating comprising the reaction product of (1) from about 10 to 40 parts by weight of an organic diepoxide selected from the group consisting of alkyl substituted alicyclic diepoxides and epoxides having the formula:

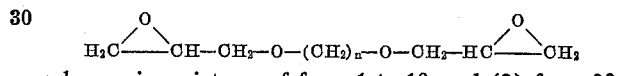

where $n$ is an integer of from 1 to 10, and (2) from 90 to 60 parts by weight of an acrolein polymer containing recurring units of the formula:

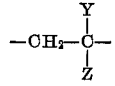

where Y is an alkyl group from 1 to 12 carbon atoms and where Z comprises the groups —CH$_2$OH, —CHO and

where X is a cation having the formula

in which R$_1$, R$_2$ and R$_3$ are selected from a member of the group consisting of hydrogen, alkyl and alkyl aryl radicals in which the alkyl portion has less than 6 aliphatic carbon atoms, where from about 20 to 45% by weight of said Z groups are —CH$_2$OH groups, from 20 to 45% by weight of said Z groups are

groups and the balance of said Z groups are —CHO groups, any remaining units in said acrolein polymer being derived from olefinically-unsaturated, polymerizable organic compounds.

References Cited in the file of this patent

UNITED STATES PATENTS 2,895,945  Fisher et al. _____ July 21, 1959